United States Patent [19]

Hirota et al.

[11] Patent Number: 4,618,893
[45] Date of Patent: Oct. 21, 1986

[54] NOISE REDUCING SYSTEM FOR VIDEO SIGNAL

[75] Inventors: Akira Hirota, Chigasaki; Takuya Tsushima, Ayase, both of Japan

[73] Assignee: Victor Company of Japan, Ltd., Yokohama, Japan

[21] Appl. No.: 634,954

[22] Filed: Jul. 27, 1984

[30] Foreign Application Priority Data

Jul. 29, 1984 [JP] Japan ............................ 58-138873

[51] Int. Cl.[4] .......................................... H04N 5/213
[52] U.S. Cl. .................................... 358/167; 358/166; 358/340
[58] Field of Search ................ 358/166, 167, 177, 36, 358/37, 336, 340, 330, 319, 327, 328; 369/133, 134, 188

[56] References Cited

U.S. PATENT DOCUMENTS

| 4,007,483 | 2/1977 | Phan Van Cang | 358/330 |
| 4,200,889 | 4/1980 | Strobele | 358/167 |
| 4,281,346 | 7/1981 | Strobele | 358/166 |
| 4,451,746 | 5/1984 | Hirose | 358/340 |
| 4,481,547 | 11/1984 | Sato | 358/340 |

Primary Examiner—Tommy P. Chin

Attorney, Agent, or Firm—Michael N. Meller

[57] ABSTRACT

A noise reducing system for a video signal, comprises a vertical pre-emphasis circuit supplied with an input video signal which is to be transmitted, for pre-emphasizing the input video signal and transmitting a pre-emphasized video signal to a transmitting system, and a vertical de-emphasis circuit supplied with a pre-emphasized video signal which is pre-emphasized by the vertical pre-emphasis circuit and is transmitted through the transmitting system, for de-emphasizing the pre-emphasized video signal. The vertical pre-emphasis circuit has a non-linear pre-emphasis characteristic for relatively emphasizing a high-frequency component of the input video signal in a vertical spatial frequency of a picture compared to a low-frequency component of the input video signal, with the degree of emphasis being reduced as the level of the input video signal increases. The vertical de-emphasis circuit has a non-linear de-emphasis characteristic for relatively attenuating a high-frequency component of the pre-emphasized video signal in a vertical spatial frequency of the picture compared to a low-frequency component of the pre-emphasized video signal, with the degree of attenuation being reduced as the level of the pre-emphasized video signal increases.

6 Claims, 22 Drawing Figures

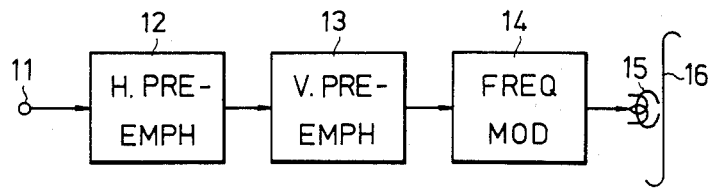
FIG.1A
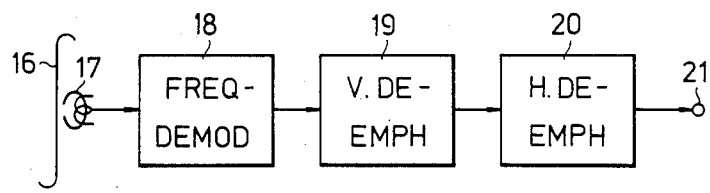
FIG.1B
FIG.2A
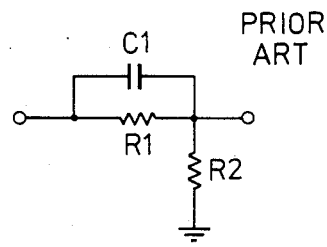
PRIOR ART
FIG.2B
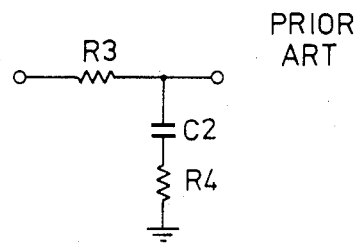
PRIOR ART
FIG.3A
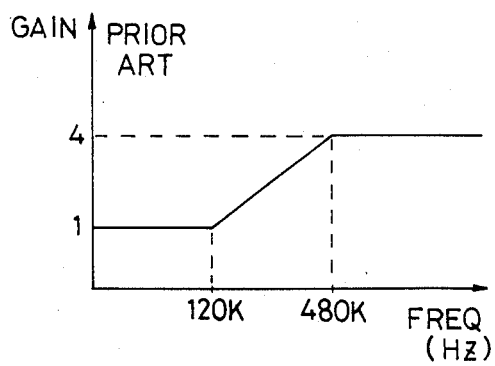
PRIOR ART
FIG.3B
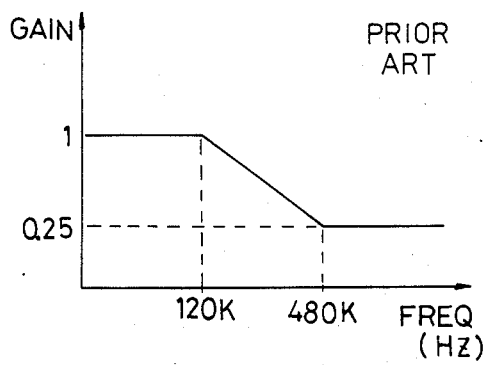
PRIOR ART

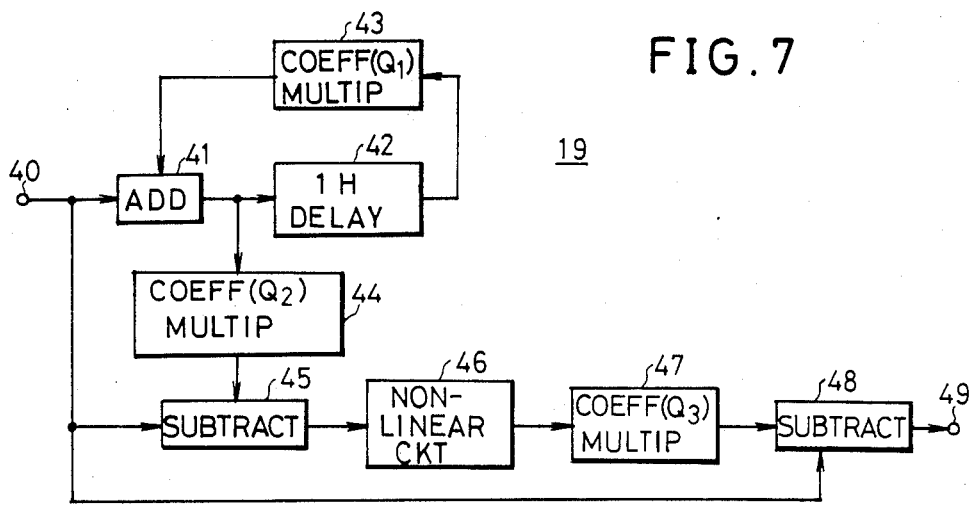
FIG.7
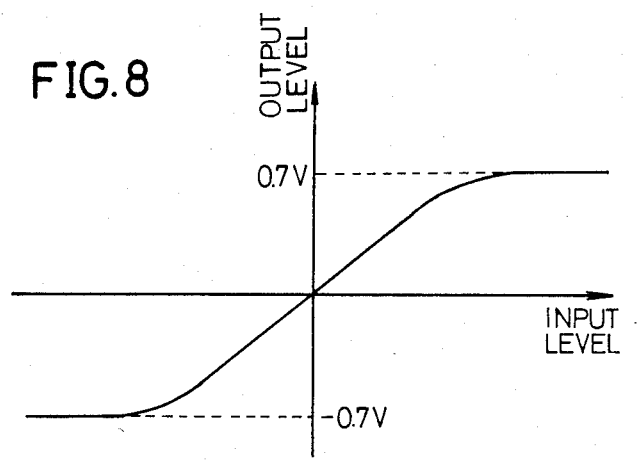
FIG.8
FIG.11   FIG.12
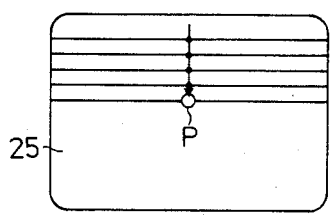
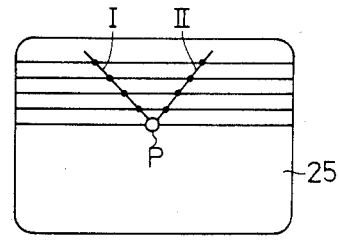
FIG.13
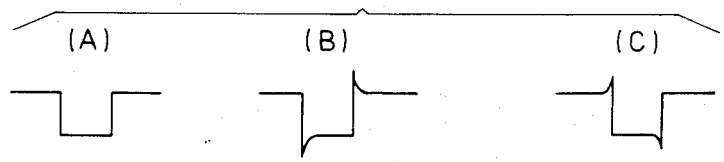

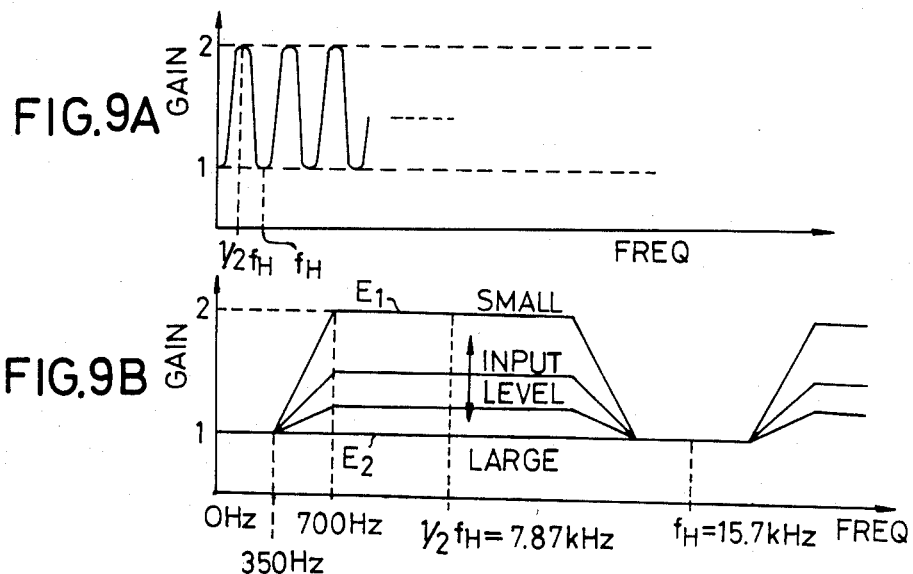
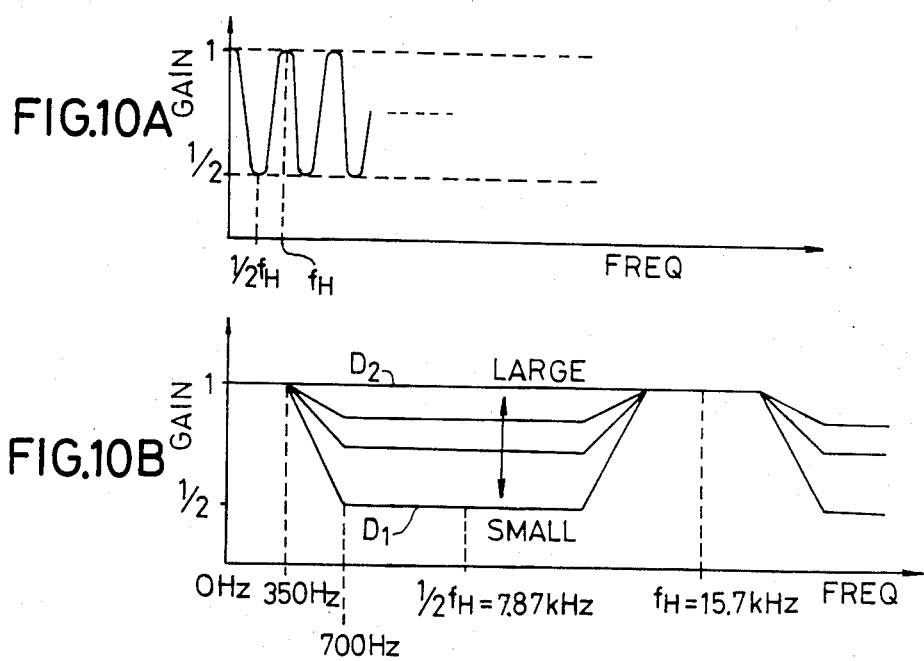

NOISE REDUCING SYSTEM FOR VIDEO SIGNAL

BACKGROUND OF THE INVENTION

The present invention generally relates to noise reducing systems for video signals, and more particularly to a noise reducing system for reducing noise in a video signal which is recorded onto a magnetic recording medium and reproduced from the magnetic recording medium, by subjecting the recording video signal to a pre-emphasis with respect to the vertical direction of a picture in a recording system at the time of the recording and by subjecting the reproduced video signal to a de-emphasis with respect to the vertical direction of the picture in a reproducing system at the time of the reproduction.

Conventionally, pre-emphasis and de-emphasis circuits are known for reducing noise in a video signal which is recorded and reproduced. In a recording system, the recording video signal is subjected to a pre-emphasis in the pre-emphasis circuit, and the reproduced video signal is subjected to a de-emphasis in the de-emphasis circuit within a reproducing system. In the case of a frequency modulated video signal, the signal-to-noise ratio becomes poorer for high-frequency components of the frequency modulated video signal. However, the pre-emphasis circuit can emphasize the high-frequency components of the video signal before the recording. At the time of the reproduction, the high-frequency components of the reproduced video signal are de-emphasized back to their original levels. Therefore, it is possible to record and reproduce the high-frequency components of the video signal with a satisfactory S/N ratio by use of such pre-emphasis and de-emphasis circuits.

A conventional pre-emphasis circuit employed a highpass filter or a transversal filter comprising a capacitor (C) and a resistor (R). A conventional de-emphasis circuit employed a lowpass filter or a transversal filter comprising a capacitor (C) and a resistor (R). Both the pre-emphasis and de-emphasis circuits were designed to add, to an information which is related to a signal obtained at the present point in time, a weighed information which is related to a signal obtained at a past point in time which is extremely close to the present. This weighted information is obtained by subjecting the information which is related to the signal obtained at the past point in time which is extremely close to the present, to a predetermined weighting.

However, as will be described later on in the specification in conjunction with the drawings, the conventional emphasis circuits were designed to perform the pre-emphasis or the de-emphasis, by subtracting from or adding to an information related to a predetermined point in a reproduced picture, information related to a plurality of points which are positionally lagging (to the left of the predetermined point in the reproduced picture) or advanced (to the right of the predetermined point in the reproduced picture) with respect to the predetermined point on a horizontal scanning line which includes the predetermined point. According to such emphasis circuits, the high-frequency noise in the horizontal direction will be averaged, and the S/N ratio of the video signal will be improved. In the present specification, the emphasis performed in the conventional emphasis circuits will be referred to as horizontal emphasis.

Because the conventional emphasis circuit only performs the horizontal emphasis described above, the noise can be reduced satisfactorily in a case where the noise is in the form of a vertical line which is long in the vertical direction of the picture and has a short width in the horizontal direction of the picture, for example. The noise can be reduced satisfactorily in this case, since the frequency of the noise in the horizontal direction is high. On the other hand, in a case where the noise is in the form of a horizontal line which has a short width in the vertical direction of the picture and is long in the horizontal direction of the picture, the frequency of the noise in the horizontal direction is low. For this reason, the noise reducing effect was very poor in this case, and the conventional emphasis circuit suffered a disadvantage in that such a noise in the form of a horizontal line could hardly be reduced. In the present specification, the above noise in the form of a horizontal line which has a low frequency in the horizontal direction of the picture and has a high frequency in the vertical direction of the picture, will be referred to as a horizontal line noise. In actual practice, the horizontal line noise is easily generated in the reproduced picture. Hence, there was a demand for a system which could effectively reduce such a horizontal line noise.

When a pre-emphasis is performed in the pre-emphasis circuit, an overshoot and an undershoot occurs at the leading and trailing edges of the output pre-emphasized signal. When this pre-emphasized signal is frequency-modulated in a frequency modulator, the instantaneous frequency of the frequency modulated signal which is produced from the frequency modulator becomes extremely high at the leading edge of the pre-emphasized signal where the overshoot occurs, and the level rises to white level from black level. Thus, when the above frequency modulated signal is recorded onto and reproduced from a magnetic tape, the level of the frequency modulated signal may exceed a slicing range of a limiter which is located in a stage prior to a frequency modulator, in a case where the overshoot exceeds a predetermined level. When the level of the frequency modulated signal exceeds the slicing range of the limiter, a signal dropout will occur in the output of the limiter, and this signal dropout will be frequency-demodulated as a low-frequency signal in the frequency demodulator. As a result, the level of the frequency demodulated signal will drop to the black level, and the so-called color inversion phenomenon is introduced.

Accordingly, a clipping circuit which clips the emphasized signal so that the level at the tip of the overshoot does not exceed a predetermined level, was generally provided in a stage prior to the frequency modulator. However, as the degree of emphasis was increased in order to obtain a larger emphasis effect, the overshoots and undershoots in the emphasized signal became greater. In this case, the degree of clipping became greater so as to properly clip the greater overshoots and undershoots, and as a result, the picture quality became poor at the leading and trailing edges of the emphasized signal. For this reason, it is impossible to excessively increase the degree of emphasis.

Therefore, it is impossible to reduce the horizontal line noise by increasing the degree of emphasis, and it is highly desirable to realize a system for reducing such horizontal line noise.

Hence, the present inventors have previously proposed a noise reducing system for video signals, in which the disadvantages described heretofore have been eliminated. This previously proposed system is disclosed in a U.S. patent application Ser. No. 576,155 entitled "NOISE REDUCING SYSTEM FOR VIDEO SIGNAL" filed Feb. 2, 1984. According to this previously proposed system, an emphasis is performed with respect to the vertical direction of the picture, and a de-emphasis complementary to the emphasis is performed with respect to the vertical direction of the picture. According to this previously proposed system, it is possible to satisfactorily reduce especially the horizontal line noise, since the emphasis and the de-emphasis are performed with respect to the vertical direction of the picture. In the present specification, such an emphasis performed with respect to the vertical direction of the picture, will simply be referred to as a vertical emphasis as opposed to the horizontal emphasis described before.

However, when the input video signal having a large level is subjected to the same pre-emphasis as the input video signal having a small level, overshoots and undershoots of large levels will occur. These overshoots and undershoots of large levels, will be clipped in the clipping circuit which is located in a stage subsequent to the pre-emphasis circuit, and the original information which is missing due to the clipping inevitably increases. In this case, there is a problem in that the signal waveform of the output video signal of the de-emphasis circuit at the time of the reproduction, becomes different from the signal waveform of the original video signal. In addition, especially when the input video signal having the large level is subjected to the same pre-emphasis or de-emphasis as the input video signal having the small level, there is a problem in that the signal waveform at the edge of the video signal becomes greatly distorted.

SUMMARY OF THE INVENTION

Accordingly, it is a general object of the present invention to provide a novel and useful noise reducing system for a video signal, which is an improvement over the previously proposed system described before, and in which the problems described heretofore have been eliminated.

Another and more specific object of the present invention is to provide a noise reducing system for a video signal, in which a pre-emphasis circuit has a characteristic for relatively emphasizing the level of a high-frequency component in a vertical spatial frequency of an input signal compared to a low-frequency component, depending on the level of the input signal, and a de-emphasis circuit has a characteristic for relatively de-emphasizing a high-frequency component in a vertical spatial frequency of a reproduced signal compared to a low-frequency component of the reproduced signal, so as to carry out the emphasis with respect to the vertical direction of the picture. The characteristic of the de-emphasis circuit is complementary to the vertical spatial frequency versus level characteristic of the pre-emphasis circuit. According to the system of the present invention, the noise within the video signal can be reduced even with respect to low horizontal spatial frequencies. Thus, it is possible to effectively reduce the horizontal line noise, for example. In addition, even in a case where the level of the input signal is excessively large, the emphasis will not be performed to an excessively large extent. When the emphasis is performed to an excessively large extent and excessively large overshoots occur, the excessively large overshoots will be clipped in the clipping circuit and problems such as missing of signal components, over-modulation, color inversion phenomenon, or the like will occur. However, according to the system of the present invention, such problems will not occur.

Other objects and further features of the present invention will be apparent from the following detailed description when read in conjunction with the accompanying drawings.

BRIEF DESCRIPTION OF THE DRAWINGS

FIGS. 1A and 1B are systematic block diagrams respectively showing a video signal recording system and a video signal reproducing system which are applied with a noise reducing system according to the present invention;

FIGS. 2A and 2B are circuit diagrams respectively showing an example of a conventional pre-emphasis circuit and an example of a de-emphasis circuit;

FIGS. 3A and 3B are graphs respectively showing frequency response characteristics of the circuits shown in FIGS. 2A and 2B;

FIG. 7 is a systematic block diagram showing an embodiment of a vertical de-emphasis circuit which is employed in the system according to the present invention;

FIG. 8 is a graph showing an input versus output characteristic of a non-linear circuit within the block system shown in FIG. 6;

FIG. 9A is a graph showing the frequency response characteristic of the vertical pre-emphasis circuit shown in FIG. 6, and FIG. 9B shows a part of FIG. 9A in an enlarged scale;

FIG. 10A is a graph showing the frequency response characteristic of the vertical de-emphasis circuit shown in FIG. 7, and FIG. 10B shows a part of FIG. 10A in an enlarged scale;

FIG. 11 is an illustration showing a picture for explaining the emphasis effect obtained in the system of the present invention;

FIG. 12 is an illustration showing a picture for explaining the emphasis effect obtained in the system of the present invention when a delay time in a delay circuit is set to a value which is slightly different from 1H, where H represents one horizontal scanning period;

FIGS. 13(A) through 13(C) are graphs respectively showing waveforms of the original and pre-emphasized signals;

DETAILED DESCRIPTION

Figure 4:
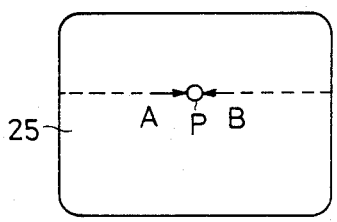
FIG. 4 is an illustration showing a picture for explaining the emphasis effect obtained in the conventional system.

A video signal recording system and a video signal reproducing system which are applied with a noise reducing system according to the present invention, are respectively shown in FIGS. 1A and 1B. A video signal which is to be recorded, is supplied to a horizontal pre-emphasis circuit 12 shown in FIG. 1A, through an input terminal 11. The video signal is pre-emphasized in the horizontal pre-emphasis circuit 12, with respect to the horizontal direction of a picture. A known pre-emphasis circuit having a capacitor C1 and resistors R1 and R2 as shown in FIG. 2A for example, may be used for the horizontal pre-emphasis circuit 12. The pre-emphasis circuit shown in FIG. 2A has a frequency response characteristic shown in FIG. 3A, and this circuit pre-emphasizes the signal components in the high frequency range as compared to the signal components in the low frequency range.

An output signal of the horizontal pre-emphasis circuit 12 is supplied to a vertical pre-emphasis circuit 13 of the present invention which will be described later on in the specification. An output signal of the vertical pre-emphasis circuit 13 is supplied to a frequency modulator 14, and a frequency modulated signal from the frequency modulator 14 is recorded onto a magnetic tape 16 by a recording magnetic head 15.

The recorded signal on the magnetic tape 16, is reproduced by a reproducing magnetic head 17 shown in FIG. 1B. The reproduced signal is supplied to a frequency demodulator 18 wherein the reproduced signal is frequency-demodulated. The demodulated signal is supplied to a vertical de-emphasis circuit 19 of the present invention which performs a de-emphasis with respect to the vertical direction of the picture. The vertical de-emphasis circuit 19 has a frequency response characteristic which is complementary to the frequency response characteristic of the vertical pre-emphasis circuit 13. An output signal of the vertical de-emphasis circuit 19 is supplied to a horizontal de-emphasis circuit 20 which performs a de-emphasis with respect to the horizontal direction of the picture. The horizontal de-emphasis circuit 20 has a frequency response characteristic which is complementary to the frequency response characteristic of the horizontal pre-emphasis circuit 12. As a result, a reproduced video signal which has been subjected to emphasis in the horizontal and vertical directions of the picture and has been reduced of the noise in the horizontal and vertical directions on the picture, is produced through an output terminal 21. This reproduced video signal has a high S/N ratio, and is supplied to a television receiver through a predetermined signal processing circuit.

In FIG. 1A, the vertical pre-emphasis circuit 13 may be coupled in a stage prior to the horizontal pre-emphasis circuit 12. Similarly, the vertical de-emphasis circuit 19 shown in FIG. 1B may be coupled in a stage subsequent to the horizontal de-emphasis circuit 20. Further, in the system according to the present invention, the horizontal pre-emphasis circuit 12 shown in FIG. 1A and the horizontal de-emphasis circuit 20 shown in FIG. 1B are not essential to the system, and these circuits 12 and 20 may be omitted.

A known de-emphasis circuit having a capacitor C2 and resistors R3 and R4 as shown in FIG. 2B, for example, may be used for the horizontal de-emphasis circuit 20. The de-emphasis circuit shown in FIG. 2B has a frequency response characteristic shown in FIG. 3B, and this circuit de-emphasizes the signal components in the high frequency range as compared to the signal components in the low frequency range by suppressing the signal components in the high frequency range. In FIGS. 3A and 3B, the slopes of the characteristic between frequencies $f_1$ and $f_2$ are respectively 6 dB/oct and −6 dB/oct.

Instead of the capacitor-resistor (CR) circuits shown in FIGS. 2A and 2B, a forward type transversal filter and a backward type transversal filter proposed in a U.S. patent application Ser. No. 534,638 filed Sept. 22, 1983 entitled "VIDEO SIGNAL PROCESSING SYSTEM" in which the assignee is the same as the assignee of the present application, may be used for the horizontal pre-emphasis circuit 12 and the horizontal de-emphasis circuit 20.

When the CR circuits shown in FIGS. 2A and 2B or the forward type transversal filter is used for the conventional horizontal pre-emphasis circuit 12 and the horizontal de-emphasis circuit 20, the noise is averaged and reduced in the emphasized signal. In other words, by subtracting from or adding to an original signal related to a predetermined point P in a reproduced picture 25, signals related to a plurality of points which are positionally lagging (to the left of the predetermined point P in the reproduced picture) with respect to the predetermined point P on a horizontal scanning line which includes the predetermined point P, the noise is averaged and reduced. On the other hand, when the backward type transversal filter is used for the conventional horizontal pre-emphasis circuit 12 and the horizontal de-emphasis circuit 20, the noise is averaged and reduced by subtracting from or adding to the original signal related to the predetermined point P in the reproduced picture 25, signals related to a plurality of points which are positionally advanced (to the right of the predetermined point P in the reproduced picture) with respect to the predetermined point P on the horizontal scanning line which includes the predetermined point P.

Thus, the horizontal pre-emphasis circuit 12 and the horizontal de-emphasis circuit 20 merely perform horizontal emphasis. The noise can be reduced satisfactorily in a case where the noise is in the form of a vertical line which is long in the vertical direction of the picture and has a short width in the horizontal direction of the picture, for example. The noise can be reduced satisfactorily in this case, since the frequency of the noise in the horizontal direction of the picture is high. On the other hand, in a case of a horizontal line noise which has a short width in the vertical direction of the picture and is long in the horizontal direction of the picture, the frequency of the noise in the horizontal direction of the picture is low. For this reason, the noise reducing effect is very poor with respect to the horizontal line noise, and the horizontal line noise can hardly be reduced.

Figure 5:
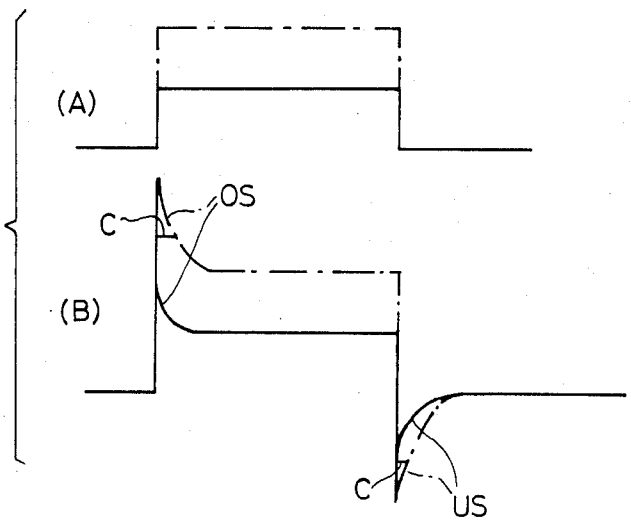
FIGS. 5(A) and 5(B) are graphs for explaining an input signal and an overshoot generated by a pre-emphasis.

In addition, in general, when the pre-emphasis is performed with respect to an input signal having a signal waveform shown in FIG. 5(A), an overshoot OS and an undershoot US are respectively generated at the rising and falling edges of the input signal as shown in FIG. 5B. The overshoot OS and the undershoot US are larger when the level of the input signal is large as indicated by a one-dot chain line in FIG. 5(A), compared to the case where the level of the input signal is small as indicated by a solid line in FIG. 5(A). When the overshoot OS and the undershoot US are large as indicated by a one-dot chain line in FIG. 5(B), the overshoot OS and the undershoot US are clipped at a level C shown in FIG. 5(B) in a clipping circuit which is located in a subsequent stage. When the large overshoot OS and undershoot US in the pre-emphasized signal are clipped, signal components corresponding to the clipped overshoot and undershoot will be missing. Thus, when such a pre-emphasized and clipped signal is de-emphasized, it is impossible to obtain a signal having the original signal waveform of the input signal.

Accordingly, the system of the present invention is designed to reduce the above horizontal line noise which cannot be reduced in the conventional emphasis circuits, and so that no problems will occur even when the level of the input signal is large. Description will hereinafter be given with respect to the vertical pre-emphasis circuit 13 and the vertical de-emphasis circuit 19.

Figure 6:
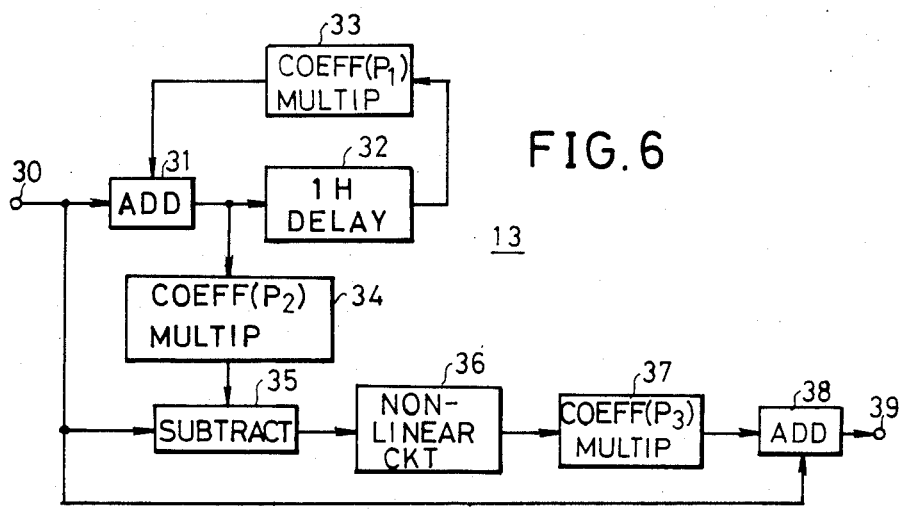
FIG. 6 is a systematic block diagram showing an embodiment of a vertical pre-emphasis circuit which is employed in the system according to the present invention.

An embodiment of the vertical pre-emphasis circuit 13 is shown in FIG. 6. The output video signal of the horizontal pre-emphasis circuit 12 shown in FIG. 1A, is supplied to an adding circuit 31, a subtracting circuit 35, and to an adding circuit 38, through an input terminal 30. The signal which has passed through the adding circuit 31, is supplied to a delay circuit 32 wherein the signal is delayed by a predetermined delay time. The delay time of the delay circuit 32 is set approximately equal to one horizontal scanning period (that is, 63.5 $\mu$sec and hereinafter simply referred to as 1H). The signal which is delayed by 1H in the delay circuit 32, is supplied to a coefficient multiplying circuit (attenuating circuit) 33 which multiplies a coefficient $P_1$ ($P_1=0.76$, for example) to the signal. The delayed output signal of the delay circuit 32, which is multiplied by the coefficient $P_1$ in the coefficient multiplying circuit 33, is added with the signal from the input terminal 30 in the adding circuit 31. The output signal of the adder 31 is supplied again to the delay circuit 32 and delayed by 1H. Hence, an operation in which the output signal of the delay circuit 32 is multiplied by the coefficient $P_1$ in the coefficient multiplying circuit 33 and then supplied again to the delay circuit 32, is repeated. On the other hand, the output signal of the adding circuit 31 is also supplied to a coefficient multiplying circuit 34 which multiplies a coefficient $P_2$ ($P_2=0.24$, for example). An output signal of the coefficient multiplying circuit 34 is subjected to a subtraction between the signal from the input terminal 30, in the subtracting circuit 35.

An output signal of the subtracting circuit 35 is supplied to a non-linear circuit 36. The non-linear circuit 36 is constituted by a type of a limiter, and has an input versus output characteristic shown in FIG. 8. The non-linear circuit 36 does not perform an amplitude limiting operation with respect to an input signal having an amplitude which is smaller than a predetermined value, and simply passes such an input signal. On the other hand, the non-linear circuit 36 performs an amplitude limiting operation with respect to an input signal having an amplitude larger than the predetermined value.

An output signal of the non-linear circuit 36 is supplied to a coefficient multiplying circuit 37 wherein the signal is multiplied by a coefficient $P_3$ ($P_3=1.3$, for example). An output signal of the coefficient multiplying circuit 37 is supplied to the adding circuit 38 and added with the input signal from the input terminal 30. An output signal of the adding circuit 38 is produced through an output terminal 39, as a vertically pre-emphasized signal.

The frequency characteristic of the vertical pre-emphasis circuit 13 shown in FIG. 6, is similar to a comb filter characteristic as may be seen from FIG. 9A. The circuit of the present invention uses a part of the characteristic, and this part of the characteristic is shown in an enlarged scale in FIG. 9B. In FIG. 9B, a sinusoidal curve is approximated and shown as a polygonal straight line. The pre-emphasis characteristic is changed by the provision of the non-linear circuit 36, so that the characteristic approaches a characteristic $E_1$ as the level of the input signal decreases and approaches a characteristic $E_2$ as the level of the input signal increases. As a result, the degree of the pre-emphasis is reduced when the level of the input signal is large, so as to prevent a large overshoot from occurring and therefore avoid the lack of signal components due to the clipping of the large overshoot in the clipping circuit which is located in the subsequent stage.

If the delay time of the delay circuit 32 is represented by $\tau$, the output video signal which is obtained through the output terminal 39 is a signal from which signals existing $\tau, 2\tau, 3\tau, \ldots, n\tau$ (n is an integer) in the past with respect to the input video signal from the input terminal 30 have been subtracted. In other words, when the delay time $\tau$ is set to 1H as described before, the output video signal is a signal from which signals (at black points in FIG. 11) in the vertical direction existing 1H, 2H, $\ldots$, nH prior to the signal at the point P within the reproduced picture 25 shown in FIG. 11 have been subtracted. The vertical pre-emphasis circuit shown in FIG. 6 has a characteristic for emphasizing the high-frequency component in the vertical spatial frequency of the input signal compared to the low-frequency component of the input signal.

An embodiment of the vertical de-emphasis circuit 19 is shown in FIG. 7. The output video signal of the frequency demodulator 18 shown in FIG. 1A, is supplied to an adding circuit 41 and to subtracting circuits 45 and 48, through an input terminal 40. The signal which has passed through the adding circuit 41, is supplied to a delay circuit 42 wherein the signal is delayed by a predetermined delay time. The delay time of the delay circuit 42 is set approximately equal to 1H (that is, 63.5 $\mu$sec). The signal which is delayed by 1H in the delay circuit 42, is supplied to a coefficient multiplying circuit (attenuating circuit) 43 which multiplies a coefficient $Q_1$ ($Q_1=0.87$, for example) to the signal. The delayed output signal of the delay circuit 42, which is multiplied by the coefficient $Q_1$ in the coefficient multiplying circuit 43, is added with the signal from the input terminal 40 in the adding circuit 41. The output signal of the adder 41 is supplied again to the delay circuit 42 and delayed by 1H. Hence, an operation in which the output signal of the delay circuit 42 is multiplied with the coefficient $Q_1$ in the coefficient multiplying circuit 43 and then supplied again to the delay circuit 42, is repeated.

On the other hand, the output signal of the adding circuit 41 is also supplied to a coefficient multiplying circuit 44 which multiplies a coefficient $Q_2$ ($Q_2=0.13$, for example). An output signal of the coefficient multiplying circuit 44 is subjected to a subtraction between the signal from the input terminal 40 in the subtracting circuit 45. An output signal of the subtracting circuit is supplied to a non-linear circuit 46. An output signal of the non-linear circuit 46 is passed through a coefficient multiplying circuit 47 which multiplies a coefficient $Q_3$ ($Q_3=0.57$, for example) to the signal. An output signal of the coefficient multiplying circuit 47 is subjected to a subtraction between the signal from the input terminal 40. An output signal of the subtracting circuit 48 is produced through an output terminal 49, as a vertically de-emphasized signal.

If the delay time of the delay circuit 42 is represented by $\tau$ (same as the delay time $\tau$ of the delay circuit 32), the output video signal which is obtained through the output terminal 49 is a signal which is added with signals existing $\tau$, $2\tau$, $3\tau$, ..., $n\tau$ (n is an integer) in the future with respect to the input frequency demodulated video signal. In other words, the vertical de-emphasis circuit 19 shown in FIG. 7 has a characteristic for attenuating the high-frequency component in the vertical spatial frequency of the signal from the input terminal 40 compared to the low-frequency component of the signal. The frequency characteristic of the vertical de-emphasis circuit 19 shown in FIGS. 10A and 10B, is complementary to the frequency characteristic of the vertical pre-emphasis circuit 13 shown in FIGS. 9A and 9B. The de-emphasis characteristic is changed by the provision of the non-linear circuit 46, so that the characteristic approaches a characteristic $D_1$ as the level of the input signal decreases and approaches a characteristic $D_2$ as the level of the input signal increases.

According to the system of the present invention, the noise is averaged in the vertical direction of the picture. Thus, noise such as the horizontal line noise which has a low frequency in the horizontal direction (length is long in the horizontal direction) and a high frequency in the vertical direction (width is short in the vertical direction), can be effectively reduced by the system according to the present invention. Hence, with respect to the horizontal direction, the low-frequency noise under a frequency $f_2$ shown in FIGS. 3A and 3B which could not be reduced in the conventional horizontal emphasis circuits, can be effectively eliminated by the system according to the present invention. Moreover, the problems described before will not occur even when the level of the input signal is large.

The delay times $\tau$ of the delay circuits 32 and 42 may respectively be set to a value which is slightly different from 1H. When the delay times $\tau$ are respectively set to a value which is slightly larger than 1H, the subtraction or addition is carried out between the signal at the point P in the reproduced picture 25 shown in FIG. 12 and the signals at points which are arranged on an imaginary line I which slopes upwardly to the left of the picture. The emphasis in this case will be referred to as an "upwardly left-sloping emphasis" in the present specification. This upwardly left-sloping emphasis effectively reduces the noise components which extend longer in a direction which is to the upward right of the picture.

On the other hand, when the delay times $\tau$ are respectively set to a value which is slightly smaller than 1H, the subtraction or addition is carried out between the signal at the point P and the signals at points which are arranged on an imaginary line II in FIG. 12 which slopes upwardly to the right of the picture. The emphasis in this case will be referred to as an "upwardly right-sloping emphasis" in the present specification. This upwardly right-sloping emphasis effectively reduces the noise components which extend longer in a direction which is to the upward left of the picture.

The time it takes to scan in the horizontal direction to cover a vertical distance (separation) between two adjacent horizontal scanning lines of the same video field in the picture, is 180 nsec. Thus, when the delay times $\tau$ are respectively set to a value which is larger or smaller than 1H (63.5 $\mu$sec) by the above time of 180 nsec, an upwardly left-sloping emphasis which is inclined by 45° to the vertical direction of the picture, or an upwardly right-sloping emphasis which is inclined by 45° to the vertical direction of the picture, is performed.

In either case of the upwardly left-sloping emphasis or the upwardly right-sloping emphasis, it is not only possible to obtain a predetermined frequency response characteristic with respect to the horizontal direction, but it is also possible to obtain a predetermined frequency response characteristic with respect to the vertical direction. Consequently, compared to the case of the horizontal emphasis, the low-frequency noise can be reduced effectively.

Generally, the vertical correlation in the video signal is high. If it is assumed that the original video signal has the waveform shown in FIG. 13(A) within 1H, the upwardly left-sloping pre-emphasis will result in a pre-emphasized video signal having a waveform shown in FIG. 13(B) in which the overshoots are pre-emphasized as in the case of the conventional pre-emphasis circuit. However, the level of the overshoots is suppressed to a low level compared to the conventional case where the horizontal pre-emphasis is performed, because the vertical pre-emphasis is also performed in the present invention. On the other hand, when the upwardly right-sloping pre-emphasis is performed, pre-shoots will occur in the output video signal as shown in FIG. 13(C). Accordingly, the pre-shoots which are usually difficult to form, can easily be formed by the upwardly right-sloping pre-emphasis.

Figure 14:
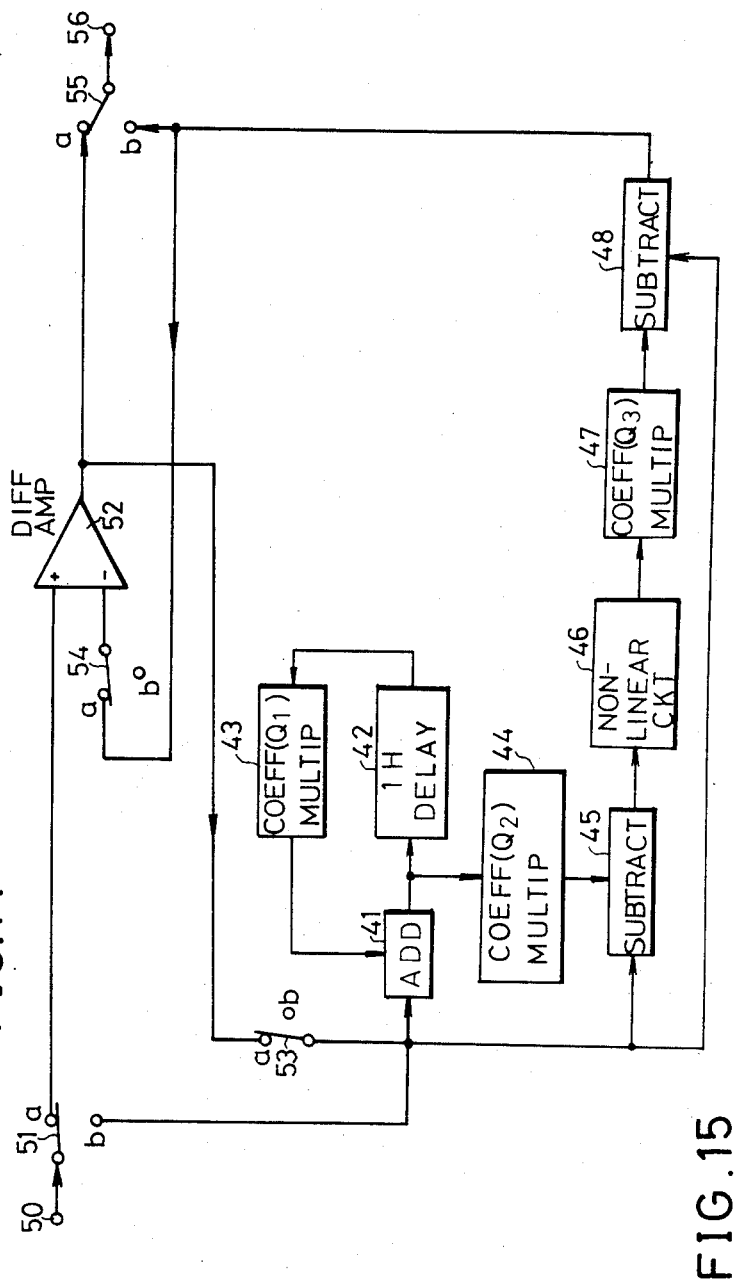
FIG. 14 is a systematic block diagram showing another embodiment of the vertical pre-emphasis circuit and the de-emphasis circuit employed in the system according to the present invention.

Next, description will be given with respect to an embodiment in which the vertical pre-emphasis circuit and the vertical de-emphasis circuit are constituted by a common circuit, by referring to FIG. 14. In FIG. 14, those parts which are the same as those corresponding parts in FIG. 7 are designated by the same reference numerals. At the time of the recording, switches 51, 53, 54, and 55 are connected to respective terminals a. An input video signal (luminance signal) applied to an input terminal 50, is supplied to a non-inverting input terminal of a differential amplifier 52 through the switch 51. An output signal of the differential amplifier 52 is passed through the switch 53, and is supplied to the adding circuit 41 and to the subtracting circuits 45 and 48. The output signal of the adding circuit 41 is passed through the delay circuit 42, and is supplied to the coefficient multiplying circuit 43 which multiplies the coefficient $Q_1$ ($Q_1=0.87$, for example) to the signal. The output signal of the coefficient multiplying circuit 43 is supplied to the adding circuit 41. The output signal of the adding circuit 41 is also supplied to the coefficient multiplying circuit 44 which multiplies the coefficient $Q_2$ ($Q_2=0.13$, for example) to the signal. The output signal of the coefficient multiplying circuit 44 is supplied to the subtracting circuit 45 and subjected to a subtraction between the output signal of the differential amplifier 52. The output signal of the subtracting circuit 45 is passed through the non-linear circuit 46, and is supplied to the coefficient multiplying circuit 47 which multiplies the coefficient $Q_3$ ($Q_3=0.57$, for example) to the signal. The output signal of the coefficient multiplying circuit 47 is supplied to the subtracting circuit 48 and subjected to a subtraction between the output signal of the differential amplifier 52. The output signal of the subtracting circuit 48 is supplied to a non-inverting input terminal of the differential amplifier 52, through the switch 54. The output signal of the differential amplifier 52 is passed through the switch 55, and is produced through an output terminal 56.

The adding circuit 41, the delay circuit 42, the coefficient multiplying circuits 43, 44, and 47, the subtracting circuits 45 and 48, and the non-linear circuit 46 constitute a de-emphasis circuit which is the same as the de-emphasis circuit shown in FIG. 7. The circuit shown in FIG. 14 has a pre-emphasis characteristic complementary to the de-emphasis characteristic of the circuit shown in FIG. 7, when a differential amplification takes place in the differential amplifier 52 between the input signal and the signal which is passed through the de-emphasis circuit. Accordingly, the signal obtained through the output terminal 56, is a pre-emphasized signal.

On the other hand, at the time of the reproduction, the switches 51 and 55 are connected to respective terminals b, and the switches 53 and 54 are connected to respective dummy terminals b. Accordingly, the differential amplifier 52 is disconnected from the remaining circuit system shown in FIG. 14. In other words, the remaining circuit system including the adding circuit 41, the delay circuit 42, the coefficient multiplying circuits 43, 44, and 47, the subtracting circuits 45 and 48, and the non-linear circuit 46, constitute a de-emphasis circuit. The reproduced pre-emphasized signal which is applied to the input terminal 50, is supplied to the adding circuit 41 and to the subtracting circuits 45 and 48, and is de-emphasized in the de-emphasis circuit. The output signal of the subtracting circuit 48 is passed through the switch 55, and is produced through the output terminal 56. The signal which is obtained through the output terminal 56, is a signal which is de-emphasized to the original signal and in which the noise is reduced.

In the embodiment shown in FIG. 14, the de-emphasis circuit is used so as to obtain a pre-emphasis characteristic complementary to the de-emphasis characteristic of the de-emphasis circuit, by performing a differential amplification in the differential amplifier 52 between the output signal of the de-emphasis circuit and the input signal. However, it is possible to use a pre-emphasis circuit so as to obtain a de-emphasis characteristic complementary to the pre-emphasis characteristic of the pre-emphasis circuit, by performing a differential amplification between the output signal of the pre-emphasis circuit and the input signal.

Figure 15:
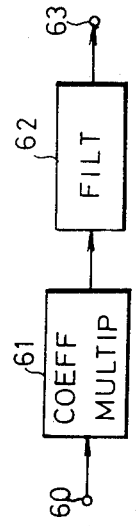
FIG. 15 is a systematic block diagram showing a modification of a part of each of the above embodiments.

Instead of the coefficient multiplying circuits 33 and 43 employed in the embodiments shown in FIGS. 6, 7, and 14, it is possible to employ a circuit comprising a coefficient multiplier 61 and a filter 62 coupled in series with the coefficient multiplier 61, as shown in FIG. 15. In this case, the output signals of the delay circuits 32 and 42 are supplied to an input terminal 60, and an output signal obtained through an output terminal 63 is supplied to the adding circuits 31 and 41. A capacitor-resistor (CR) type filter, a transversal type filter, or the like, may be used for the filter 62. The filter 62 has a characteristic for attenuating the high-frequency component, so that the high-frequency component is relatively attenuated compared to the low-frequency component. The filter 62 attenuates the high-frequency component of the delayed video signal from the delay circuit, and produces through the output terminal 63 a signal in which the signal waveform is rounded.

By use of the circuit shown in FIG. 15, the signal waveform of the delayed video signal is rounded. For this reason, with respect to an emphasis which is determined by the delay times of the delay circuits 32 and 42 and are performed in the vertical direction of the picture or in an oblique direction between the vertical and horizontal directions of the picture, an emphasis is additionally performed in a direction which is slightly different from the vertical or oblique direction. In this case, a slight delay is further introduced in the delayed video signal when the filter 62 is constituted by the high-frequency attenuation type CR circuit shown in FIG. 2B. Hence, in this case, the signal components are added in various directions in only the left side of the picture with respect to one specific direction determined by the delay times of the delay circuits 32 and 42. On the other hand, it is possible to obtain signals which are slightly advanced and slightly lagging in time with respect to the output delayed video signals of the delay circuits 32 and 42, when the filter 62 is constituted by a transversal filter having a high-frequency attenuation characteristic. In this other case, the signal components are added in various directions symmetrically to the right and left of the picture with respect to the above specific direction.

Next, description will be given with respect to concrete circuits of the block systems shown in FIGS. 6 and 7, by referring to FIGS. 16 and 17.

Figure 16:
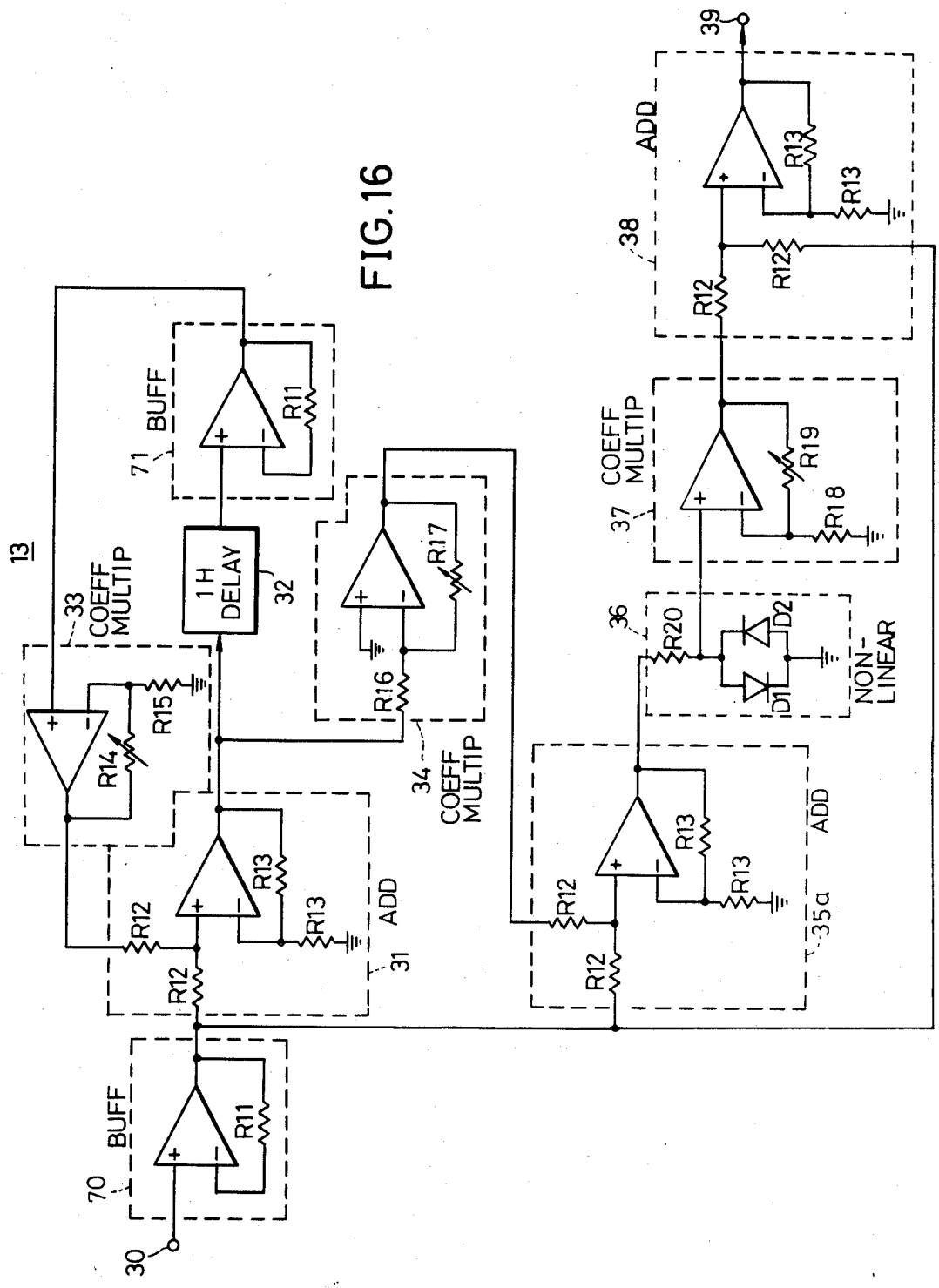
FIG. 16 is a circuit diagram showing an embodiment of a concrete circuit within the block system shown in FIG. 6.

FIG. 16 shows a concrete circuit corresponding to the vertical pre-emphasis circuit 13 shown in FIG. 6. In FIG. 16, the signal from the input terminal 30 is passed through a buffer circuit 70 which comprises an operational amplifier and a resistor $R_{11}$. An output signal of this buffer circuit 70, is supplied to the adding circuit 31, an adding circuit 35a, and to the adding circuit 38. The adding circuits 31, 35a, and 38 each comprise an operational amplifier and resistors $R_{12}$ and $R_{13}$. The signal from the coefficient multiplying circuit 33 which comprises an operational amplifier and resistors $R_{14}$ and $R_{15}$, and the input signal which is obtained through the buffer circuit 60, are added in the adding circuit 31. The output signal of the adding circuit 31 is delayed by 1H in the 1H delay circuit 32, and the delayed output signal of the delay circuit 32 is passed through a buffer circuit 71 which comprises an operational amplifier and a resistor $R_{11}$. An output signal of this buffer circuit 71, is supplied to the coefficient multiplying circuit 33. The output signal of the adding circuit 31 is also supplied to the coefficient multiplying circuit 34 which comprises an operational amplifier and resistors $R_{16}$ and $R_{17}$. In the coefficient multiplying circuit 33, the resistance of the variable resistor $R_{14}$ is adjusted so that the following equation is satisfied.

$$(R_{14}+R_{15})/R_{15}=P_1=0.76$$

Further, in the coefficient multiplying circuit 34, the resistance of the variable resistor $R_{17}$ is adjusted so that the following equation is satisfied.

$$R_{16}/R_{17}=P_2=0.24$$

The signal supplied to the coefficient multiplying circuit 34, is multiplied by the coefficient $P_2$ and is inverted of its phase. The output signal of the coefficient multiplying circuit 34 is then supplied to the adding circuit 35a wherein the signal is added with the input signal which is obtained through the buffer circuit 70, and a substantial subtraction takes place in the adding circuit 35a. The output signal of the adding circuit 35a is supplied to the non-linear circuit 36 which comprises a resistor $R_{20}$ and diodes $D_1$ and $D_2$ which are coupled in parallel with mutually opposite polarities. The non-linear circuit 36 passes an input signal having a small level unchanged and subjects an input signal having a large level to a level compression. The output signal of the non-linear circuit 36 is supplied to the coefficient multiplying circuit 37 which comprises an operational amplifier and resistors $R_{18}$ and $R_{19}$, and is multiplied by the coefficient $P_3$. In the coefficient multiplying circuit 37, the resistance of the variable resistor $R_{19}$ is adjusted so that the following equation stands.

$$(R_{18}+R_{19})/R_{18}=P_3=1.5$$

The output signal of the coefficient multiplying circuit 37 is supplied to the adding circuit 38 which comprises an operational amplifier and resistors R12 and R13, and is added with the output signal of the buffer circuit 70. The output signal of the adding circuit 38 is obtained through the output terminal 39. The gains of the buffer circuits 70 and 71, are respectively equal to one.

Figure 17:
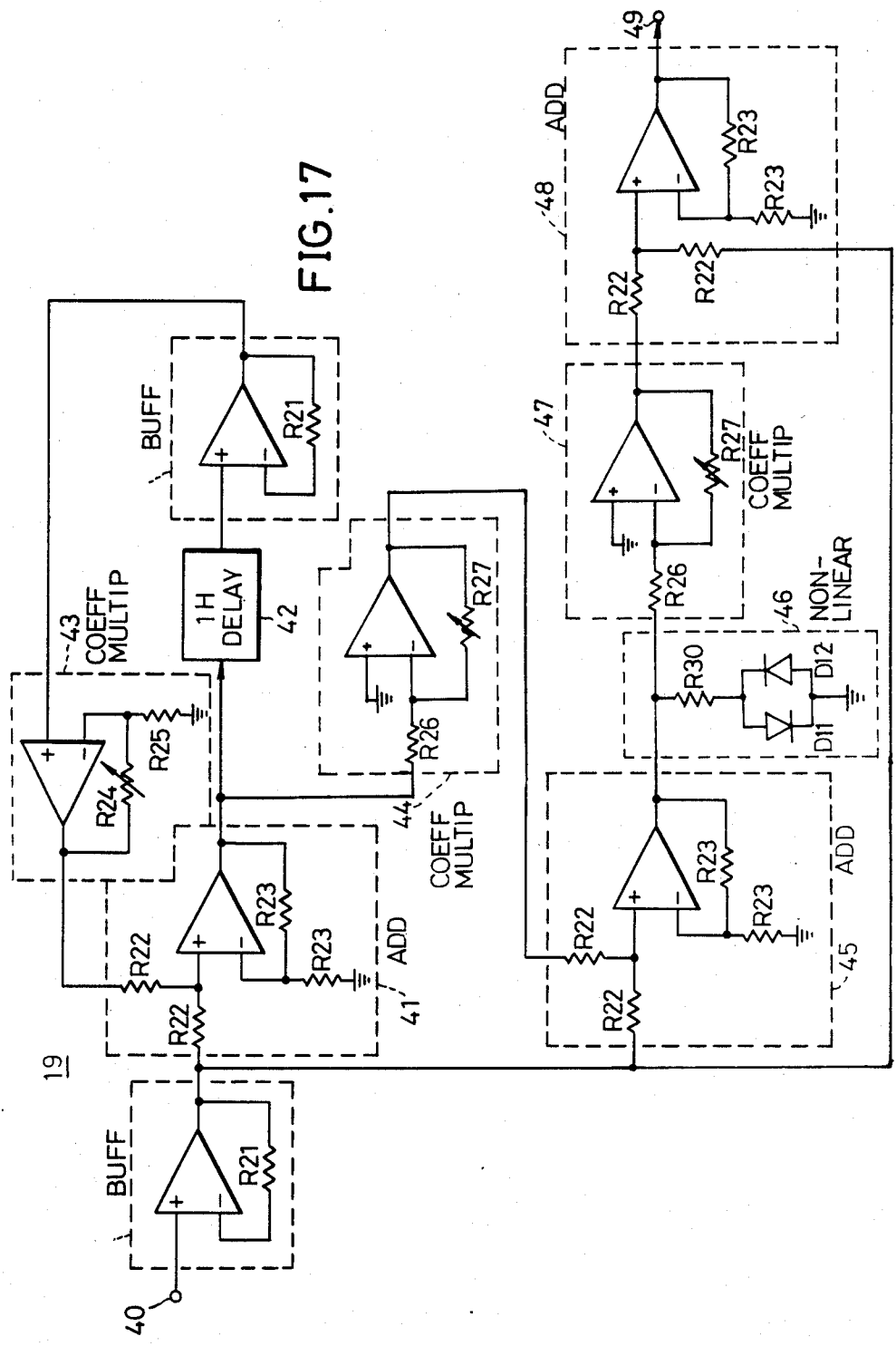
FIG. 17 is a circuit diagram showing an embodiment of a concrete circuit within the block system shown in FIG. 7.

FIG. 17 shows a concrete circuit corresponding to the vertical de-emphasis circuit 19 shown in FIG. 7. The construction of the circuit shown in FIG. 17 is the same as the construction of the circuit shown in FIG. 16, and detailed description of the circuit shown in FIG. 17 will be omitted. Buffer circuits 80 and 81 each comprise an operational amplifier and a resistor $R_{21}$. The coefficient multiplying circuit 43 comprises an operational amplifier and resistors $R_{24}$ and $R_{25}$, and the resistance of the variable resistor $R_{24}$ is adjusted so that the following equation is satisfied.

$$(R_{24}+R_{25})/R_{25}=Q_1=0.87$$

The coefficient multiplying circuit 44 comprises an operational amplifier and resistors $R_{26}$ and $R_{27}$, and the resistance of the variable resistor $R_{27}$ is adjusted so that the following equation . is satisfied.

$$R_{26}/R_{27}=Q_2=0.13$$

Further, the coefficient multiplying circuit 47 comprises an operational amplifier and resistors $R_{26}$ and $R_{27}$, and the resistance of the variable resistor R is adjusted so that the following equation is satisfied.

$$R_{26}/R_{27}=Q_3=0.57$$

The phase of the signal is inverted in the coefficient multiplying circuit 47, and for this reason, a substantial subtraction takes place between the two signals in the adding circuit 48.

In the embodiments described heretofore, the coefficient multiplying circuits 34 and 44 are connected so as to receive the respective output signals of the adding circuits 31 and 41. However, the coefficient multiplying circuits 31 and 41 may be connected so as to receive the respective output signals of the delay circuits 32 and 42.

Further, the present invention is not limited to these embodiments, but various variations and modifications may be made without departing from the scope of the present invention.

What is claimed is:

1. A noise reducing system for a video signal, said noise reducing system comprising:
vertical pre-emphasis means supplied with an input video signal which is to be transmitted for pre-emphasizing the input video signal and transmitting a pre-emphasized video signal to a transmitting system, said vertical pre-emphasis means having such a non-linear pre-emphasis characteristic that said vertical pre-emphasis means relatively emphasizes a high-frequency component of the input video signal in a vertical spatial frequency of a picture compared to a low-frequency component of the input video signal with a degree of emphasis which decreases as the level of the input video signal increases; and
vertical de-emphasis means for receiving said pre-emphasized video signal after said pre-emphasized video signal has been transmitted through said transmitting system for de-emphasizing said pre-emphasized video signal, said vertical de-emphasis means having such a non-linear de-emphasis characteristic that said vertical de-emphasis means relatively attenuates a high-frequency component of said pre-emphasized video signal in a vertical spatial frequency of the picture compared to a low-frequency component of said pre-emphasized video signal, with a degree of attenuation which decreases as the level of said pre-emphasized video signal increases to produce a de-emphasized video output signal.

2. A noise reducing system as claimed in claim 1 in which said vertical pre-emphasis means comprises first and second adding circuits supplied with said input video signal, a first subtracting circuit supplied with said input video signal, a first delay circuit for delaying an output signal of said first adding circuit by a predetermined delay time $\tau$, a first coefficient multiplying circuit for multiplying a first coefficient $P_1$ to an output signal of said first delay circuit and for supplying an output signal to said first adding circuit, a second coefficient multiplying circuit for multiplying a second coefficient $P_2$ to the output signal of said first adding circuit and for supplying an output signal to said first subtracting circuit, a first non-linear circuit supplied with an output signal of said first subtracting circuit, said first non-linear circuit passing the output signal of said first subtracting circuit unchanged when the signal level is small and limiting the level of the output signal of said first subtracting circuit when the signal level is large, and a third coefficient multiplying circuit for multiplying a third coefficient $P_3$ to an output signal of said first non-linear circuit and for supplying an output signal to said second adding circuit, said second adding circuit producing an output of said vertical pre-emphasis means, and said vertical de-emphasis means comprises a third adding circuit supplied with said pre-emphasized video signal, second and third subtracting circuits supplied with said pre-emphasized video signal, a second delay circuit for delaying an output signal of said third adding circuit by said predetermined delay time $\tau$, a fourth coefficient multiplying circuit for multiplying a fourth coefficient $Q_1$ to an output signal of said second delay circuit and for supplying an output signal to said third adding circuit, a fifth coefficient multiplying circuit for multiplying a fifth coefficient $Q_2$ to an output signal of said third adding circuit and for supplying an output signal to said second subtracting circuit, a second non-linear circuit supplied with an output signal of said second subtracting circuit, said second non-linear circuit passing the output signal of said second subtracting circuit unchanged when the signal level is small and limiting the level of the output signal of said second subtracting circuit when the signal level is large, and a sixth coefficient multiplying circuit for multiplying a sixth coefficient $Q_3$ to an output signal of said second non-linear circuit and for supplying an output signal to said third subtracting circuit, said third subtracting circuit producing an output of said vertical de-emphasis means.

3. A noise reducing system as claimed in claim 2 in which said first and second non-linear circuits are each made up of an amplitude limiter.

4. A noise reducing system as claimed in claim 2 in which said first, second, and third coefficient multiplying circuits have coefficients of $P_1=0.76$, $P_2=0.24$, and $P_3=1.3$, and said fourth, fifth, and sixth coefficient multiplying circuits have coefficients of $Q_1=0.87$, $Q_2=0.13$, and $Q_3=0.57$.

5. A noise reducing system as claimed in claim 1 in which said vertical pre-emphasis means comprises obtaining means for obtaining said pre-emphasized video signal from said input video signal and said de-emphasized video output signal of said vertical de-emphasis means, said pre-emphasized video signal being a signal which is pre-emphasized with a pre-emphasis characteristic complementary to the de-emphasis characteristic of said vertical de-emphasis means and which is then supplied to said vertical de-emphasis means.

6. A noise reducing system as claimed in claim 5 in which said obtaining means comprises a differential amplifier supplied with said input video signal and said de-emphasized video output signal of said vertical de-emphasis means, wherein said pre-emphasized video signal is an output signal of said differential amplifier which is supplied to said vertical de-emphasis means.

* * * * *